(12) United States Patent
Kanso et al.

(10) Patent No.: US 11,190,619 B2
(45) Date of Patent: Nov. 30, 2021

(54) GENERATION AND APPLICATION OF META-POLICIES FOR APPLICATION DEPLOYMENT ENVIRONMENTS

(71) Applicant: International Business Machines Corporation, Armonk, NY (US)

(72) Inventors: Ali Kanso, Elmsford, NY (US); Paolo Dettori, Hartsdale, NY (US); Alexey Roytman, Givat Elah (IL); Kuan Feng, Ontario (CA); Todd Eric Kaplinger, Raleigh, NC (US); Tamar Eilam, New York, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 19 days.

(21) Appl. No.: 16/360,361

(22) Filed: Mar. 21, 2019

(65) Prior Publication Data

US 2020/0304599 A1    Sep. 24, 2020

(51) Int. Cl.
| | |
|---|---|
| *H04L 29/08* | (2006.01) |
| *G06F 9/445* | (2018.01) |
| *G06F 8/61* | (2018.01) |
| *G06F 8/41* | (2018.01) |
| *G06F 9/455* | (2018.01) |

(52) U.S. Cl.
CPC .............. *H04L 67/34* (2013.01); *G06F 8/43* (2013.01); *G06F 8/61* (2013.01); *G06F 9/44505* (2013.01); *G06F 9/45558* (2013.01); *H04L 67/1002* (2013.01); *G06F 2009/4557* (2013.01)

(58) Field of Classification Search
CPC ....... H04L 67/34; H04L 67/1002; G06F 8/43; G06F 8/61; G06F 9/44505; G06F 9/45558
See application file for complete search history.

(56) References Cited

U.S. PATENT DOCUMENTS

| | | |
|---|---|---|
| 8,805,970 B2 | 8/2014 | Breh et al. |
| 9,172,608 B2 | 10/2015 | Zeyliger et al. |
| 9,223,966 B1 * | 12/2015 | Satish ............ G06F 21/564 |
| 9,733,959 B2 | 8/2017 | Hu et al. |
| 10,482,237 B2 * | 11/2019 | Kim ............ G06F 21/53 |

(Continued)

OTHER PUBLICATIONS

"Kubediff." github.com. Last Accessed Jan. 31, 2019. 3 pages. https://github.com/weaveworks/kubediff/blob/master/README.md.

(Continued)

*Primary Examiner* — Mohamed A. Wasel

(74) *Attorney, Agent, or Firm* — Amin, Turocy & Watson, LLP

(57) ABSTRACT

Systems, computer-implemented methods, and computer program products that can facilitate generating and applying meta-policies for application deployment environments are provided. According to an embodiment, a system can comprise a memory that stores computer executable components and a processor that executes the computer executable components stored in the memory. The computer executable components can comprise a state analyzer that can analyze a first application deployment environment to identify a first configuration of the first application deployment environment. The computer executable components can further comprise a policy generator that generates a meta-policy based on the identified first configuration.

10 Claims, 11 Drawing Sheets

(56) References Cited

U.S. PATENT DOCUMENTS

| | | | |
|---|---|---|---|
| 10,581,675 B1* | 3/2020 | Iyer | G06F 8/71 |
| 10,606,577 B1* | 3/2020 | Benson | H04L 67/34 |
| 2007/0005320 A1 | 1/2007 | Vinberg et al. | |
| 2009/0126022 A1* | 5/2009 | Sakaki | G06F 21/12 |
| | | | 726/25 |
| 2010/0138825 A1* | 6/2010 | Harrop | G06F 9/44505 |
| | | | 717/174 |
| 2012/0102543 A1* | 4/2012 | Kohli | H04L 63/20 |
| | | | 726/1 |
| 2014/0173733 A1* | 6/2014 | Ford | H04L 63/1416 |
| | | | 726/23 |
| 2016/0212130 A1* | 7/2016 | Tsuchitoi | H04L 63/10 |
| 2017/0279826 A1* | 9/2017 | Mohanty | H04L 63/20 |
| 2017/0293887 A1* | 10/2017 | Rathbun | G06Q 10/10 |
| 2019/0287002 A1* | 9/2019 | Bhoj | H04L 43/067 |
| 2020/0218798 A1* | 7/2020 | Kosaka | G06F 9/455 |

OTHER PUBLICATIONS

Holzle, Urs "Cloud Services Platform: bringing the best of the cloud to you." Google Cloud Platform Blog. Jul. 24, 2018. 7 pages. https://cloudplatform.googleblog.com/2018/07/cloud-services-platform-bringing-the-best-of-the-cloud-to-you.html.

"IBM Multicloud Manager compliance and policy example." IBM. https://www.ibm.com/support/knowledgecenter/en/SSBS6K_3.1.1/mcm/compliance/policy_example.html. Last Accessed Mar. 15, 2019. 2 pages.

* cited by examiner

```
500 ─┐
       ┌─► kind: Meta-Policy
505 ──┤    metadata:
           name: meta-policy02
           description: Instance descriptor for meta-policy resource 507 ──► kind: RoleTemplate
            ┌ complianceType: "musthave"
            │ metadata:
510 ────┤      namespace: "default"
            └      name: admin*

520 ──► rules:
            ┌ complianceType: "musthave"
            │ policyRule:
501 ────┤      resources: [*]
            └      verbs: ["get", "list"]

┌ complianceType: "mustnothave"
            │ policyRule:
502 ────┤      resources: [*]
            └      verbs: ["create", "apply", "patch"]

┌ complianceType: "mustonlyhave"
            │ policyRule:
503 ────┤      resources: ["deployments"]
            └      verbs: ["get", "watch", "list", "delete"]
```

FIG. 5

GENERATION AND APPLICATION OF META-POLICIES FOR APPLICATION DEPLOYMENT ENVIRONMENTS

BACKGROUND

The subject disclosure relates to computer applications, and more specifically, to deploying and configuring computer applications.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, and/or computer program products that can facilitate generating and applying meta-policies for application deployment environments (ADEs), are described.

According to an embodiment, a system can comprise a memory that stores computer executable components, and a processor that executes the computer executable components stored in the memory. The computer executable components can comprise a state analyzer that can analyze a first application deployment environment to identify a first configuration of the first application deployment environment. The computer executable components can further comprise a policy generator that generates a meta-policy based on the identified first configuration.

According to another embodiment, a computer-implemented method can comprise analyzing, by a system operatively coupled to a processor, a first application deployment environment to identify a first configuration of the first application deployment environment. The method can further comprise generating, by the system, a meta-policy based on the identified first configuration.

According to another embodiment, a computer program product that can facilitate generating and applying meta-policies for application deployment environments (ADEs) is provided. The computer program product can comprise a computer readable storage medium having program instructions embodied therewith, the program instructions can be executable by a processor to cause the processor to analyze the first application deployment environment to identify a first configuration of the approved first application deployment environment. The program instructions can further cause the processor to generate the meta-policy based on the identified configuration.

BRIEF DESCRIPTION OF THE DRAWINGS

FIG. 5 illustrates an example meta-policy configuration file detailing a meta-policy, generated by one or more embodiments.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details. It is noted that the drawings of the present application are provided for illustrative purposes only and, as such, the drawings are not drawn to scale.

Generally speaking, one or more embodiments described herein can analyze the configuration of an ADE and generate a meta-policy from the configuration. As discussed in more detail in FIGS. 3-4 below, an example meta-policy can aggregate configuration elements of an ADE to capture configuration concepts that can apply to groups of ADE objects, e.g., groups of roles and resources. One way these meta-policies can be used by one or more embodiments is to evaluate the configuration settings of other ADEs.

As discussed below with FIGS. 4-8 below, in one or more embodiments, ADEs that have been certified as compliant with certain standards can be used to generate meta-policies that can propagate the compliant configurations to other ADEs. One type of data protection standard that can be used as a compliance standard by one or more embodiments, are standards described by the Health Insurance Portability and Accountability Act of 1996 (HIPAA), this being United States legislation that provides data security provisions for safeguarding medical information. The HIPAA standards are used herein as a non-limiting example of standards that can be embodied in a meta-policy generated based on an ADE configuration.

As described with FIG. 8 below, meta-policies based on compliant ADEs can be used to analyze other not yet certified ADEs to facilitate the certification of these ADEs as compliant as well. In addition, one or more embodiments can be used to monitor continuing compliance of ADEs, and identify remediation measures to address identified compliance problems.

Figure 1:
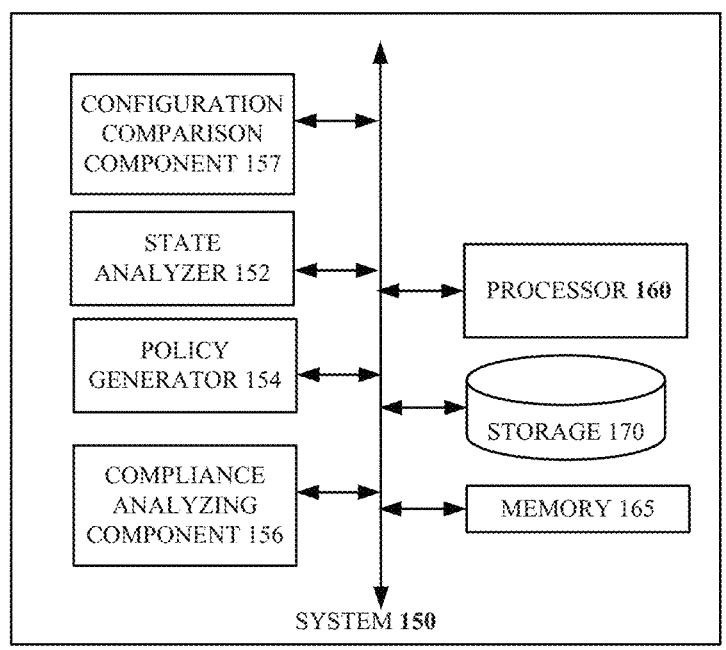
FIG. 1 illustrates a block diagram of an example, non-limiting system that can facilitate generating and applying meta-policies for an ADE, in accordance with one or more embodiments described herein.

FIG. 1 illustrates a block diagram 100 of an example, non-limiting system 150 that can facilitate generating and applying meta-policies for an ADE, in accordance with one or more embodiments described herein.

According to multiple embodiments, memory 165 can store one or more computer and/or machine readable, writable, and/or executable components and/or instructions that, when executed by processor 160, can facilitate performance of operations defined by the executable component(s) and/or instruction(s). For example, memory 165 can store computer and/or machine readable, writable, and/or executable components and/or instructions that, when executed by processor 160, can facilitate execution of the various functions described herein relating to system 150, including state analyzer 152, policy generator 154, compliance analyzing component 156, and configuration comparison component 157.

In some embodiments, memory 165 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 165 are described below with reference to system memory 1116 and FIG. 11. Such examples of memory 165 can be employed to implement any embodiments of the subject disclosure. In some embodiment, storage 170 can be a nonvolatile memory, e.g., similar to nonvolatile memory 1122 described with FIG. 11 below.

According to multiple embodiments, processor 160 can comprise one or more types of processors and/or electronic circuitry that can implement one or more computer and/or machine readable, writable, and/or executable components and/or instructions that can be stored on memory 165. For example, processor 160 can perform various operations that can be specified by such computer and/or machine readable, writable, and/or executable components and/or instructions including, but not limited to, logic, control, input/output (I/O), arithmetic, and/or the like. In some embodiments, processor 160 can comprise one or more central processing unit, multi-core processor, microprocessor, dual microprocessors, microcontroller, System on a Chip (SOC), array processor, vector processor, and/or another type of processor. Further examples of processor 160 are described below with reference to processing unit 1114 of FIG. 11. Such examples of processor 160 can be employed to implement any embodiments of the subject disclosure.

It should be appreciated that the embodiments of the subject disclosure depicted in various figures disclosed herein are for illustration only, and as such, the architecture of such embodiments are not limited to the systems, devices, and/or components depicted therein. For example, in some embodiments, system 150 can further comprise various computer and/or computing-based elements described herein with reference to operating environment 1100 and FIG. 11. In one or more embodiments, such computer and/or computing-based elements can be used in connection with implementing one or more of the systems, devices, components, and/or computer-implemented operations shown and described in connection with FIG. 1 or other figures disclosed herein.

Broadly speaking, state analyzer 152 can analyze an ADE to generate a meta-policy based on identified configuration elements, e.g., by employing policy generator 154. Additional details about this analysis, meta-policies generated, and configuration elements analyzed that can be identified, are discussed below.

It should be noted that system 150 can employ hardware and/or software (e.g., included in FIG. 1 and described with FIG. 11 below) to solve problems that are highly technical in nature, including analyzing complex combinations of configuration elements and deriving basic rules from the configuration elements, these basic rules being aggregated across systems and transformed to generate a data structure that can describe the underlying configuration elements. These processes of analysis, aggregation, and transformation to generate the data structure (e.g., as described below in one or more embodiments, a meta-policy) are not abstract and cannot be performed as a set of mental acts by a human. It should also be noted that, once generated by embodiments, the meta-policy data structure can be used to transform and change the configuration elements of ADEs.

Further, in certain embodiments, some of the processes performed can be performed by one or more specialized computers (e.g., one or more specialized processing units, a specialized computer such as tomography and reconstruction, statistical estimation, machine learning, and so on) for carrying out defined tasks related to the generation of the data structure. It should be noted that one or more embodiments provide distinct and improved approaches to multiple computer technology areas. These improvements include, but are not limited to, improving the propagation of configuration elements using a the meta-policy data structure (e.g., discussed with FIG. 7 above), improving the coordination of application and physical security measures (e.g., by using the meta-policy to coordinate user access among multiple applications and physical resources), and improvements to the remediation of data at the meta-policy level of abstraction (e.g., discussed with FIG. 8 above).

The system 150 and/or components of the system 150 can be employed to solve new problems that arise through advancements in technologies mentioned above, computer architecture, and/or the like.

Figure 2:
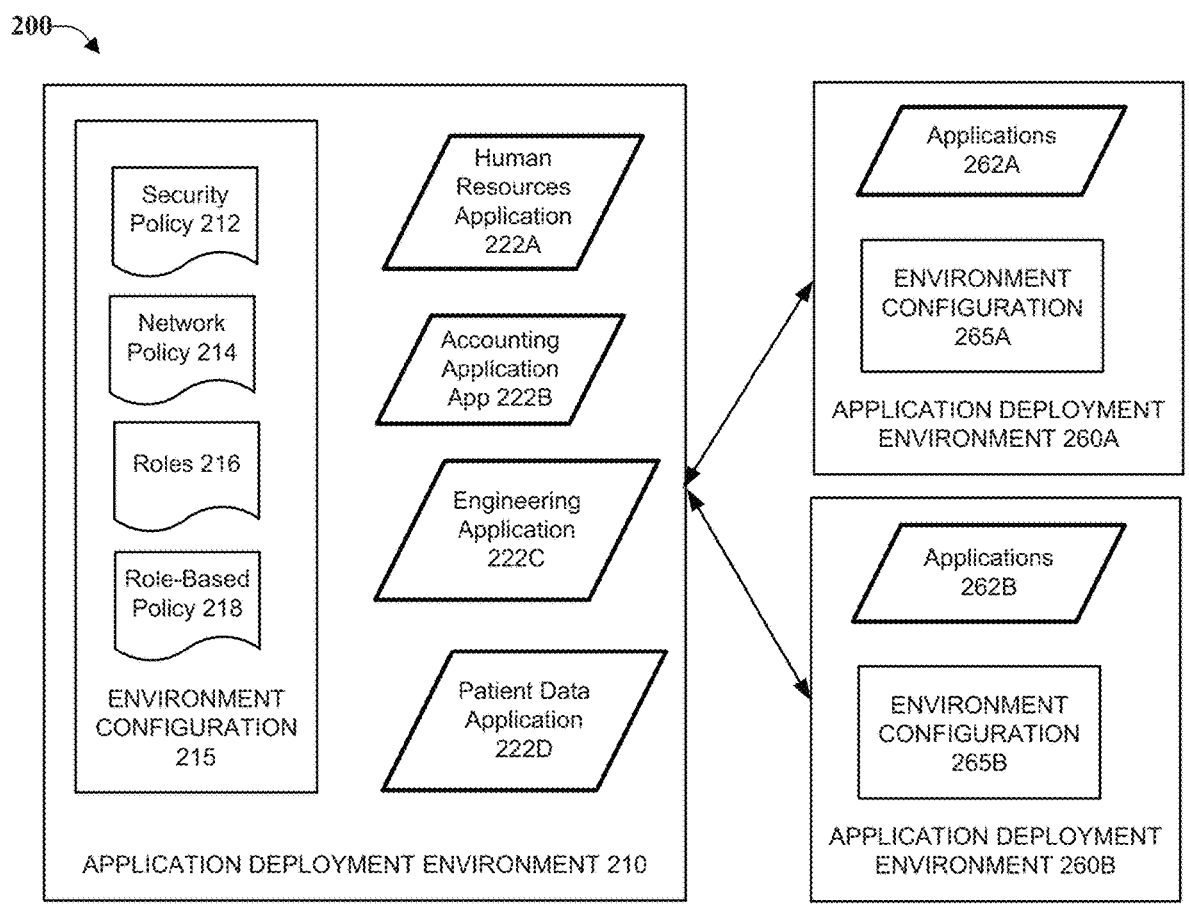
FIG. 2 illustrates components of a non-limiting system that can facilitate analyzing an ADE to generate a meta-policy based on an identified configuration, in accordance with one or more embodiments described herein.

FIG. 2 illustrates components of a non-limiting system 200 that can facilitate analyzing ADE 210 to generate a meta-policy based on an identified configuration, in accordance with one or more embodiments described herein. Repetitive description of like elements and/or processes employed in other embodiments described herein is omitted for sake of brevity.

ADE 210, in one or more embodiments, can be a group of applications that can facilitate the sharing of resources, security, and configuration elements across applications within the group. For example, in a non-limiting example, applications 222A-D can be applications that are deployed within ADE 210, e.g., human resources (HR) application 222A, accounting application 222B, engineering application, 222C, and patient data application 222D. For example, applications can have security administration requirements that are different from other applications, e.g., HR application 222A supports role-based access-control (RBAC), while engineering application 222C does not include this feature. By deploying these applications in an ADE, a system designer can, in some circumstances, achieve advantages that include, but are not limited to, uniformity in security administration across the deployed applications (e.g., enforcing RBAC in both applications discussed above), as well as improving the security of some applications, e.g., improving the overall security of engineering application 222C.

As used herein, computer applications are defined to broadly include one or more computer software components that can be used to deliver specific functionality. In one or more embodiments, applications 222A-D can be installed on a host using the operating system (OS) of the host, e.g., installed using an OS package manager. In some circumstances this approach can have disadvantages including the entangling the applications' executables, configuration, libraries, and lifecycles. Applications can be entangled with each other and with the host OS. This entanglement can, in some circumstances, can have consequences that include, but are not limited to, limiting the portability of installed applications from one host hardware configuration to another, and causing the uneven application of security protocols.

One approach that can be used to advantageously deploy an application is to deploy the applications in a container in an ADE. In one or more embodiments, by using operating-system-level virtualization, applications in containers can be isolated from each other and from the host hardware. For example, applications in containers can have separate file systems, isolated processes, and their computational resource usage can be individually bounded. Because containers can be decoupled from the underlying infrastructure and host file system, they are portable across clouds and OS distributions.

In one or more embodiments, ADE 210 can have an environment configuration 215 that specifies configuration settings for the operation of applications 222A-D individually and collectively in ADE 210. For example, as noted above, one or more embodiments can implement security policies uniformly for applications 222A-D. In one example however, one type of application can require more strict security policies than other applications, e.g., patient data application 222D can have higher security requirements than other, less data security intensive applications, such as engineering application 222C. For this example, environment configuration 215 can have individual configuration settings for individual applications, e.g., increasing the security for patient data application 222D.

In one or more embodiments, environment configuration 215 can include settings for security policies 212, network policies 214, roles 216 for users, and role-based policies 218. Security policies of ADE 210 can include user permissions, application permissions, or data access permissions. Example user permissions can be the authorization given to users that enables them to access specific resources in ADE 210, e.g., such as data files, and application. Role-based policies 218 can implement a security approach that restricts access to ADE 210 resources (e.g., application containers, data stores, as well as input and output resources), based on the roles of individual users having access to ADE 210. Roles can also specify the actions that can be performed with regards to system resources. Example actions can include, but are not limited to, create, update, delete, get, watch, list, and patch.

As noted above, in one or more embodiments, state analyzer 152 can analyze environment configuration 215 of ADE 210 to identify elements of the configuration of the ADE, e.g., the example security policies 212, network policies 214, roles 216 for users, and role-based policies 218 described above.

FIG. 2 also depicts other ADEs 260A-B. Like ADE 210, ADEs 260A-B also have respective deployed applications 262A-B and environment configurations 265A-B. As with environment configuration 215 described above, environment configurations 265A-B can store configuration elements for respective objects of ADEs 260A-B.

Expanding on the description of one or more embodiments discussed above, one or more embodiments can analyze (e.g., by system 150 operatively coupled processor 160), a first application deployment environment (e.g., ADE 210), to identify a first configuration (e.g., environment configuration 215) of the first application deployment environment. The method can further comprise generating, as discussed in more detail with FIGS. 4-6 below, a meta-policy based on the identified first configuration. One use for the generated meta-policy is to configure additional ADEs 260A-B to have the same high-level configuration as ADE 210. In one approach to implementing this configuration, one or more embodiments can compare the meta-policy generated from environment configuration 215 to a second configuration (e.g., environment configuration 265A) of a second ADE 260A.

In an example result of the comparison, one or more embodiments can identify that a first configuration element of the meta-policy (e.g., an aggregated rule based, in part on role-based policy 218) is equivalent to a second configuration element (e.g., an element comparable to role-based policy 218, stored in environment configuration 265A) of the second ADE 260A. In an alternative result discussed in further detail with FIGS. 7 and 8 below, one or more embodiments can determine that the first configuration element of the meta-policy is not equivalent to the second configuration element stored in environment configuration 265A of the second ADE 260A. Based on this result, one or more embodiments can facilitate remediation of deviating configuration elements in second ADE 260A.

Figure 3:
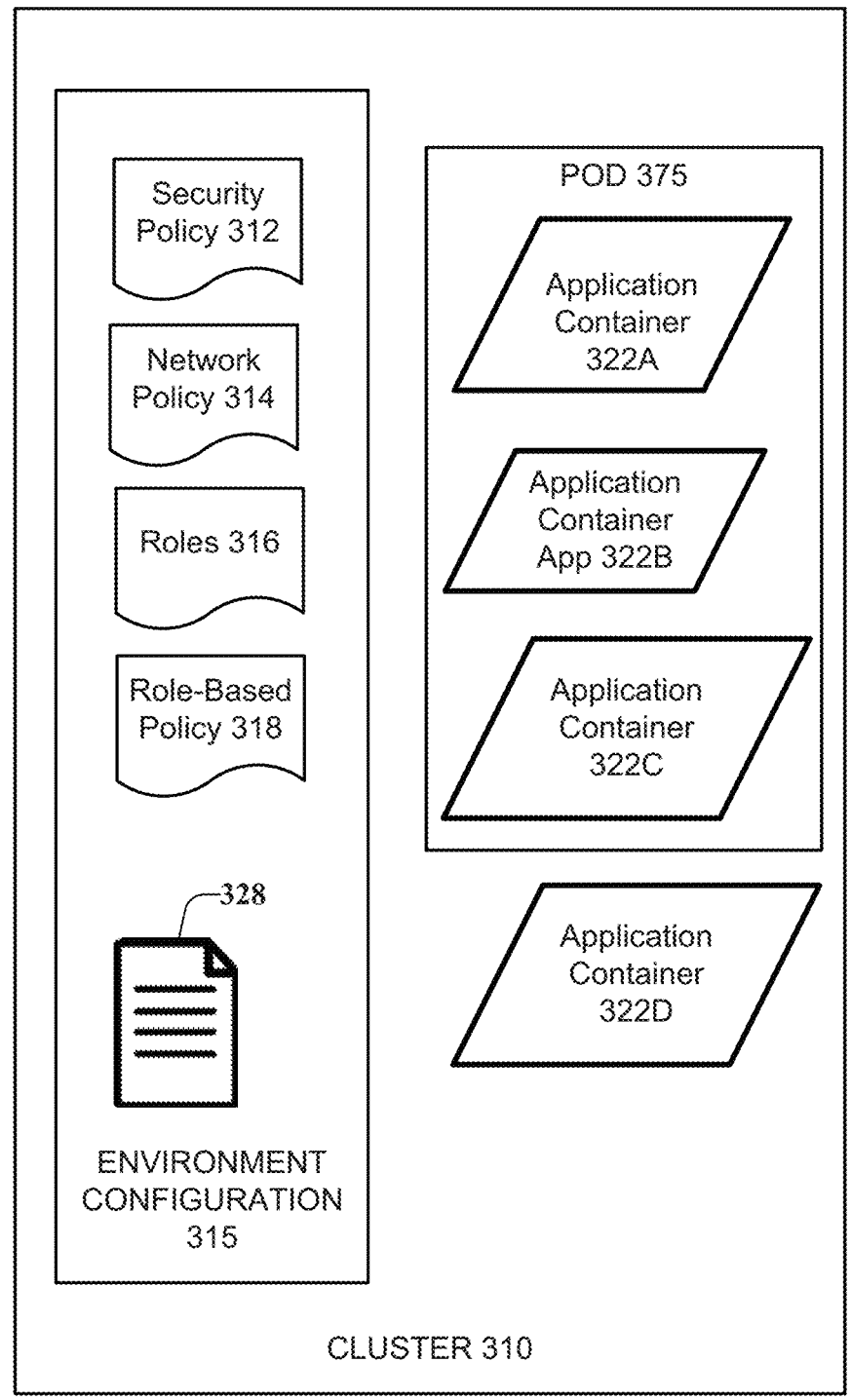
FIG. 3 depicts an example, non-limiting implementation of the ADE system described above in the Kubernetes System, in accordance with one or more embodiments described herein.

FIG. 3 depicts an example 300, non-limiting implementation of the ADE system described above in the Kubernetes application deployment (Kubernetes), in accordance with one or more embodiments described herein. Repetitive description of like elements and/or processes employed in other embodiments described herein is omitted for sake of brevity.

To add additional detail to examples of ADEs that can be analyzed by one or more embodiments, FIG. 3 depicts an implementation of ADE 210 in Kubernetes. In some implementations, Kubernetes is system that can automate deployment, scaling, and management of applications. For example, as depicted in FIG. 3, a Kubernetes cluster 310 can be similar to the ADE 210 structure described above. In Kubernetes, applications can be deployed in cluster 310 in containers 333A-D, similar to the containers for applications 222A-D discussed above with FIG. 2, e.g., with operating-system-level virtualization maintaining applications in isolation from each other and from the host hardware.

In the example 300 Kubernetes implementation depicted in FIG. 3, an additional organizing element is shown, e.g., pod 375. In one or more implementations, a Kubernetes pod 375 can group applications in one or more application containers, have allocated storage resources, a unique network IP, and an additional level of configuration settings. It should be noted that, because pods and similar structures can be configured based on environment configuration 315, pods can be accessed and configured by one or more embodiments using meta-policies and other approaches discussed herein with respect to applications 222A-D and ADE 210.

An implementation of environment configuration 315 in Kubernetes can be stored in configuration file 328. To analyze Kubernetes cluster 310 configurations, one or more embodiments can access and parse configuration file 328 to identify configuration elements. Example objects in Kubernetes can include, but are not limited to, security policy object 312, network policy object 314, roles object 316, and role-based policy 318. Examples of Kubernetes configuration files are used below to illustrate different concepts, e.g., FIGS. 4, 5, 7, and 8.

Figure 4:
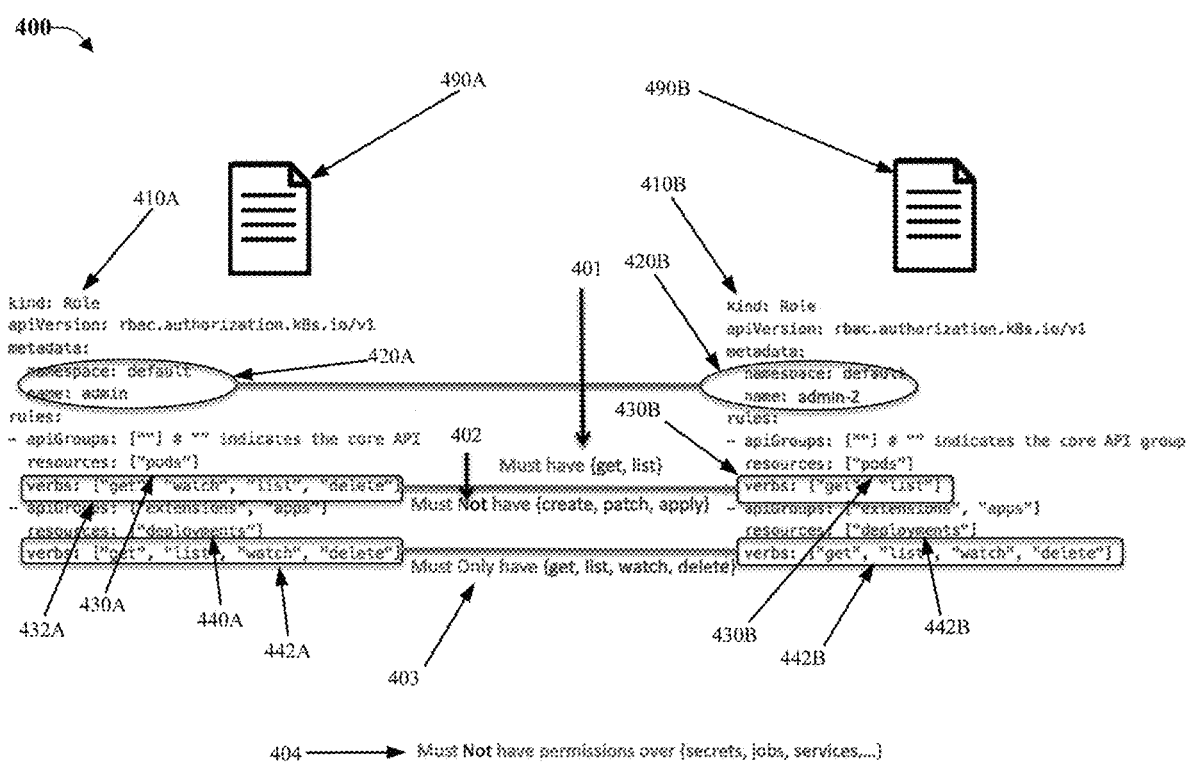
FIG. 4 illustrates two example portions of ADE configuration files, that can be analyzed by one or more embodiments.

FIG. 4 illustrates two example portions 400 of ADE configuration files 490A-B, that can be analyzed by one or more embodiments. Repetitive description of like elements and/or processes employed in other embodiments described herein is omitted for sake of brevity.

As noted above, one or more embodiments can generate a meta-policy based on an aggregation of the configuration settings of ADE 210. As further noted above with FIG. 3, one way that ADE implementations (e.g., Kubernetes) can store configuration elements is in one or more configuration files 328. When stored in this way, one or more embodiments can determine configuration elements, aggregate these elements, and generate a meta-policy that can describe the ADE as controlled by the analyzed configuration files. To illustrate the identification and aggregation of ADE elements stored in a configuration file 328, FIG. 4 depicts two configuration files 490A-B, along with annotations describing the various rules specified the files. As described in more detail with FIG. 6 below, in one or more embodiments, configuration files 490A-B are for different scopes that can have their configuration settings aggregated into a meta-policy file. After a description of the elements of both files, an example approach that can be used for configuration element aggregation is discussed below.

Other ways configuration settings can be stored for ADE components include, but are not limited to, a database registry. The portions 400 of configuration files 490A-B are directed to defining privileges for user roles 410A-B, e.g., labeled as kind: Role. Although configuration files 490A-B are directed to roles, the names of the roles affected by each file are different, e.g., in metadata 420A, the role is admin, and for metadata 420B, the role is admin-2. As discussed with FIG. 6 below, one or more embodiments can use pattern matching to match element names that are not exact matches. In this example, one or more embodiments can determine that both admin and admin-2 are references to administrator roles. Semantic analysis can also be used by one or more embodiments to match element names, e.g., admin, controller, and manager can all be semantically linked to the administrator role.

Metadata 420A-B can also specify a namespace value. In some implementations of an ADE, namespaces can be used in environments with many resources, users, and/or functions spread across multiple teams, or projects. Namespaces can be related to the names of elements described above, e.g., the admin and admin-2 roles. In one or more embodiments, namespaces can provide a scope for names, e.g., in some implementations, names of resources need to be unique within a namespace, but not across namespaces. In an example, namespaces can be used to divide ADE resources between multiple users, e.g., for access control purposes. For example, different areas of an organization can share the same ADE, but with different functions, e.g., HR, accounting, and engineering all can share the same ADE, but with each in isolation. Thus, in an example, the HR part of the organization can securely share an ADE with the engineering part, e.g., each application having a different space where their logical names will not conflict. In addition, in one or more embodiments can allocate system resources to different namespaces, e.g., dividing ADE resources between multiple users by applying resource quotas to the namespaces.

Continuing the description of configuration files 490A-B of FIG. 4, both portions displayed are directed to configuration elements of pods 430A-B. As noted above, pods are resources used in the Kubernetes example discussed above with FIG. 3 (e.g., container applications) that can be configured as a group. It is important to note that the descriptions of FIG. 4 herein can be applied to a variety of ADE resources, including, but not limited to, pods, containers, deployments, and roles. After configuring pods 430A-B, the configuration files 490A-B also list the configuration specifics for deployments 440A-B.

In the configuration files, after the resource to configure is specified (e.g., pods 430A-B), a configuration operation can specify privileges to be assigned to the specified resource. For example, as depicted in FIG. 4, privileges 432A-B respectively apply to pods 430A-B. In this example type of configuration file, privileges can be granted using verbs that describe the actions, e.g., get, watch, list, and delete. Thus, as specified in privileges 432A, in the default namespace, configuration file 490A grants the get, watch, list, and delete privileges for pods to the admin role, and in privileges 432B, in the default namespace, configuration file 490B grants the get and list privileges for pods to the admin-2 role. Similarly, as specified in privileges 442A, in the default namespace, configuration file 490A grants the get, watch, list, and delete privileges for deployments 440A to the admin role, and in privileges 442B, in the default namespace, configuration file 490B grants the get and list privileges for 440B to the admin-2 role.

With respect to namespaces, the above privileges apply to the admin and admin-2 roles in the default namespace, and in other namespaces, these roles can have different privileges assigned. As discussed below, one or more embodiments can aggregate rules across namespaces as well.

One approach that can be used by one or more embodiments to generate (e.g., by policy generator 154) a meta-policy that covers both configuration files 490A-B, begins by combining the privilege grants between and among the files. For example, when privileges 432A, 432B, 442A, and 442B are all combined together, it can be determined that the get and list privileges are granted for pods and deployments in both configuration files. In one or more embodiments, this can be specified by a rule (Rule 401) with a musthave operation, e.g., musthave ("get", "list").

To determine a second rule (Rule 402), when privileges 432A, 432B, 442A, and 442B are be combined again to create a rule based on the common privileges that privileges 432A, 432B, 442A, and 442B do not have. For example, if the full set of privileges is get, watch, list, delete, create, patch, and apply, then these grants have in common that they do not have create, patch, and apply, and, for example, a mustnothave ("create", "patch", and "apply") configuration operation can be used.

After combining all four privilege grants, the grants can be compared for the resource specific privileges, e.g., 432A to 432B and 442A to 442B. For example, for deployments 440A-B, privileges 442A and 442B can be aggregated. Thus, because these grants have the same privileges specified, a mustonlyhave rule (Rule 403) can be generated for deployments, e.g., must only have ("get", "list", "watch", and "delete").

In this example, a secrets resource is discussed that has privileges and functions that can be important for overall system security. For example, a secret can be object that contains a small amount of sensitive data such as a password, a token, or a key. Such information might otherwise be put in data stored within a container or pod, but storing data in a secret object can allow for more control over how that is used, and can reduce the risk of accidental exposure. As a part of meta-policies generated for system security, one or more embodiments can use RBAC and principles of data protection to secure secrets resources, as a part of an overall security approach.

Continuing the discussion of configuration files 490A-B, another aggregation that can be made by one or more embodiments can compare resources that have privilege grants, e.g., 430A, 440A, 430B, 430B. For example, in an example where the only resources are pods, deployments, secrets, jobs, and services, and the resources secrets, jobs, and services do not have privilege grants in both configuration files 490A-B, then a rule (Rule 404) can be generated that specifies that no grants are to be made for secrets, jobs, and services, e.g., the mustnothave ("secrets," "jobs," "services") can be used.

It should be noted that the above example only compares configuration elements in the default namespace, for five resources (e.g., pods, deployments, secrets, jobs, and services), seven grants (e.g., get, watch, list, delete, create, patch, and apply), and a single, semantically linked, role (e.g., admin and admin-2). One having skill in the relevant arts, given the description herein, would appreciate that the approaches detailed with the embodiments above can be applied to a variety of configuration elements, including different resources, privilege grants, and roles.

As described above, rules can be generated by grouping objects and comparing configuration elements based on common elements including, but not limited to, roles and privileges granted. In addition, grouping can be performed based on labels assigned to ADE objects. In one or more embodiments, labels can be key/value pairs that can be attached to objects, such as the pods and deployments of FIG. 4. Labels can be used in some circumstances to organize and to select subsets of objects. Labels can be attached to objects at object creation time and can be subsequently added and modified at any time. As described below, one or more embodiments can use labels as additional criteria for grouping objects.

Once rules are generated, as shown in FIG. 5 discussed below, a meta-policy can be created based on combining the rules, e.g., Rules 401+402+403+404. In one or more embodiments, a meta-policy can be stored in a configuration file for use.

FIG. 5 illustrates an example meta-policy configuration file 500 detailing a meta-policy, generated by one or more embodiments, e.g., generated by policy generator 154. Repetitive description of like elements and/or processes employed in other embodiments described herein is omitted for sake of brevity.

One or more embodiments can have a meta-policy configuration file 500 that can store a meta-policy created in an approach similar to the approach described above. In FIG. 5, one way to store a meta-policy having rules 401-404 based on configuration files 490A-B is shown. As described above, the meta-policy of FIG. 4 is for the default namespace, and meta-policy configuration file 500 includes an additional rule 510 that specifies that the default namespace must have a role beginning with admin, e.g., using the wildcard statement admin*. In this type of configuration file, placing a rule in the RoleTemplate 507 definition section can apply rules to which roles are included in the namespace. For example, with rule 510, the default namespace must have a role beginning with admin, e.g., admin and admin-2 described with FIG. 4 above. Approaches to pattern matching that can be used by one or more embodiments is discussed further below with FIG. 6.

In the rules 520 section of configuration file, meta-policy rules that can be generated based on analysis of configuration files 490A-B can be specified, e.g., rules 501-503 can be derived from rules 401-403 discussed above. Example rule 501 uses a wildcard to apply to all resources and specifies, as specified by rule 401, that all resources must have get and list privilege grants for roles beginning with admin. Rule 502 also uses a wildcard to apply to all resources, and specifies, as specified by rule 402, that all resources must not have create, apply, and patch privilege grants for roles beginning with admin. Rule 503 can apply to the deployments object, and specifies, as specified by rule 403, that the privilege grant for deployments must only be get, watch, list, and delete for roles beginning with admin in the default namespace.

Figure 6:
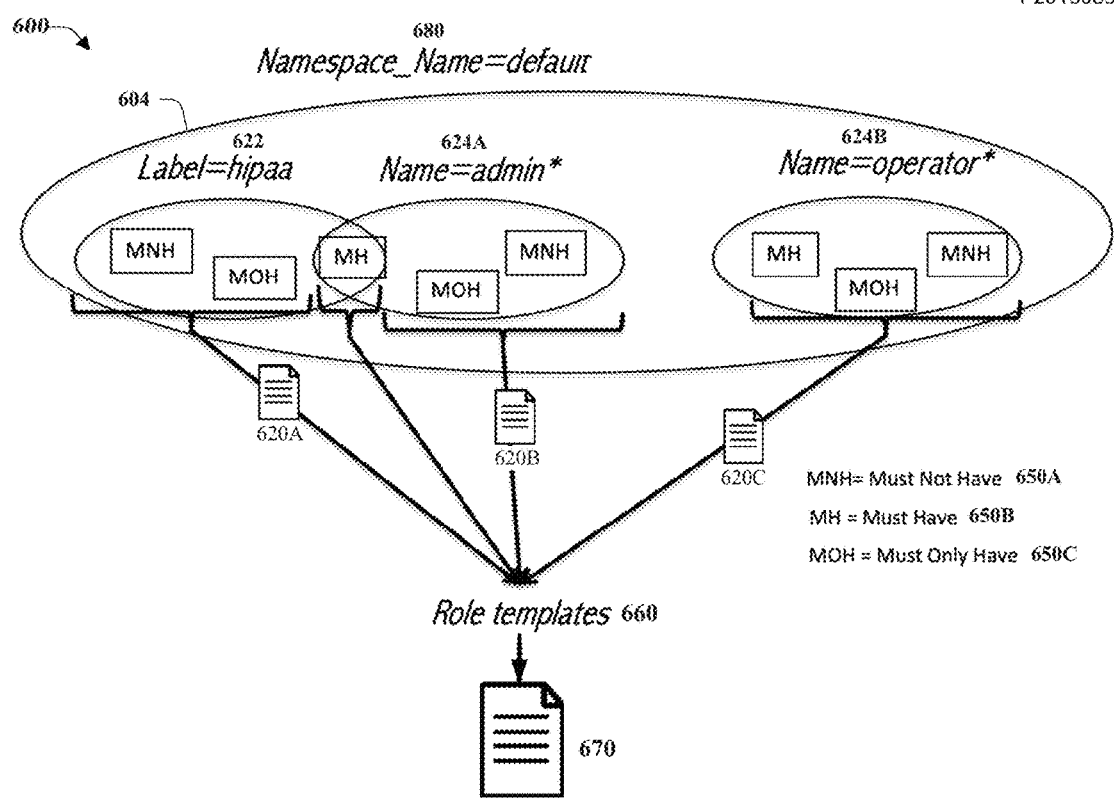
FIG. 6 depicts an example collection of groups generated from objects of an ADE to facilitate the generation of a meta-policy, in accordance with one or more embodiments.

FIG. 6 depicts an example collection 600 of groups generated from objects of an ADE, to facilitate the generation of a meta-policy 670, in accordance with one or more embodiments. Repetitive description of like elements and/or processes employed in other embodiments described herein is omitted for sake of brevity.

In an example implementation, a portion of ADE 604 is depicted for the default namespace 680, including two roles 624A-B and a label 622 applied to some ADE objects. It should be noted that roles 624A-B use pattern matching to group administrator roles. In other embodiments, additional approaches to semantically linking ADE objects can be used, e.g., regular expressions, and semantic expansion of resource names. For example, in network management, the administrator role can also be referred to as a systems operator role (e.g., sysOp). In addition, because the administrator role often includes super-user or root privileges, these terms can also be determined along with sysOp, by one or more embodiments to be equivalent to administrator.

In one or more embodiments, labels in environment configuration 215 can allow objects associated specific functions to be labeled as such. An example implementation of this type of label can add a line to configuration files 490A-B described above, e.g., label=HIPAA as shown in label 622. Based in this labeling, in this example, only the HIPAA relevant objects in ADE 604 are analyzed in the label 622 group, and used to generate a compliant meta-policy. In some circumstances, this can save time and computing resources when generating the meta-policy. For example, using labels, a HIPAA compliance analysis could include analysis of the configuration of patient data application 222D, while excluding the analysis of engineering application 222C.

Similar to the meta-policy configuration file 500 discussed above, each of the groups shown (e.g., roles 624A-B and a label 622) include mustnothave 650A, musthave 650B, and mustonlyhave 650C meta-policy rules. As shown, to generate meta-policy 670, the individual group meta-polices can be aggregated.

Figure 7:
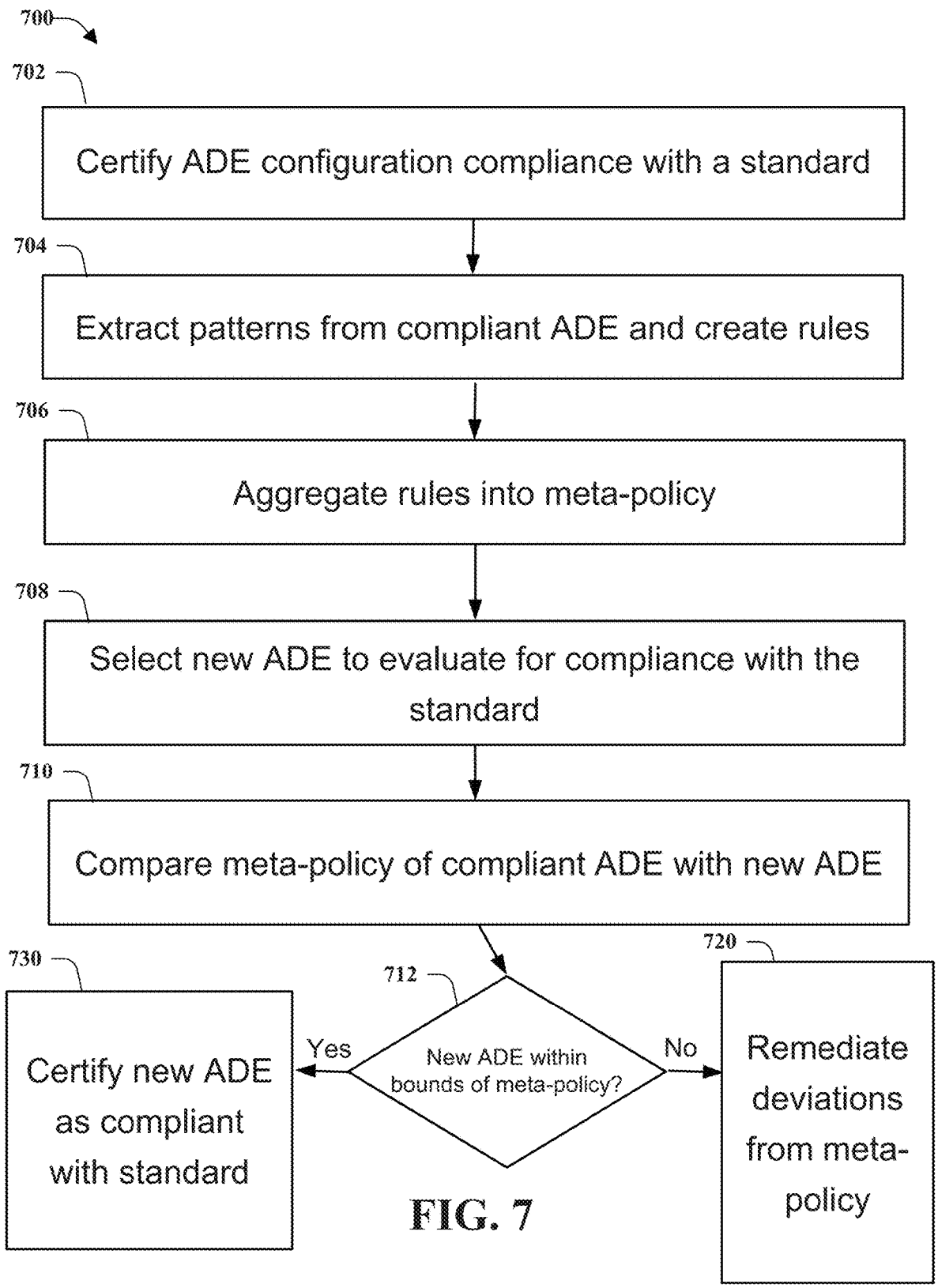
FIG. 7 depicts a flowchart of operations that can be performed by one or more embodiments to evaluate ADEs according to a standard, that can include but is not limited to, a security standard, and a data protection standard.

FIG. 7 depicts a flowchart 700 of operations that can be performed by one or more embodiments to evaluate ADEs according to a standard, that can include but is not limited to, a data protection standard. Repetitive description of like elements and/or processes employed in other embodiments described herein is omitted for sake of brevity.

At block 702, to provide an ADE upon which the meta-policy generation process described above can be performed, an ADE can be evaluated and determined to be compliant with a selected standard. Repetitive description of like elements and/or processes employed in respective embodiments is omitted for sake of brevity.

In one or more embodiments, the standard selected for the compliance operations described above is a data protection standard, e.g., HIPAA, described above. As used for compliance by one or more embodiments, a data protection standard can be a collection of rules that organizations satisfy when obtaining, handling, processing, transporting, and storing data in the course of operations and activities. One or more embodiments can use an ADE that complies with the example standard to generate the meta-policy discussed below.

For an ADE to be termed HIPAA compliant, the ADE must have implemented everything operationally that HIPAA Rules and Regulations require. These can include a number of very specific administrative, physical and technical safeguards. Developers may also be required to document system compliance for review by third parties. In one or more embodiments, a uniformly applied meta-policy generated from a compliant ADE can be an additional source of documentation of HIPAA compliance, as needed.

Example requirements for a HIPAA-compliant ADE can include, but are not limited to unique user login IDs with secure authentication. HIPAA standards generally require custom access controls, and it can be up to covered entities to determine the best way to meet this standard. Generally, access control can take business rules and security profiles into consideration to establish and enforce policies around which users can be granted privileges to access and manipulate appropriate resources. One or more embodiments not only can facilitate the propagation of HIPAA compliant access controls to other ADEs, embodiments can, by aggregating policies in a meta-policy, provide a summary of controls applied in ADEs across an enterprise.

Example requirements for a HIPAA-compliant ADE can also include, but are not limited to, RBAC based on differing and appropriately assigned roles and privileges. One challenge to implementing compliant RBAC can be a requirement to enable data access by a user only as required at a particular time, e.g., data policies should only disclose the minimum necessary information required to accomplish an intended purpose. By generating a meta-policy based on an ADE with compliant RBAC, the appropriate use of roles can be propagated to ADE systems throughout an enterprise. For example, privileges associated with times, scope of disclosures, and purposes can all be used to generate a meta-policy, in accordance with one or more embodiments described herein.

Other HIPAA requirements that can be addressed by one or more embodiments can include frequent application updates, and secure methods of data disposal. Both of these administrative tasks can require rules that address roles, privileges, and resources, e.g., administrator roles and update privileges.

In addition to HIPAA, one or more embodiments can also generate and apply meta-policies based on other types of standards, including industry specific standards, e.g., corporate reporting standards. For example, an industry standard can mandate specific internal controls on financial reporting tasks, e.g., data storage, manipulation, distribution, and disposal. These different tasks can require a variety of interconnected applications, and an ADE can be a useful environment for installing and managing these applications. As discussed herein, one or more embodiments can leverage the compliance work performed on an ADE by distributing the policies of a compliant ADE to other ADEs, as required. Other standards that can be used by one or more embodiments include data protection standards specific to other regions.

In different circumstances, this compliance evaluation, monitoring, and maintenance process for standards, e.g., based on comprehensive analysis by domain experts, can be expensive and time consuming, e.g., because of manual evaluation of different configuration options. In some circumstances, meta-policies generated and applied by one or more embodiments can reduce the overall costs of compliance across an enterprise.

At block 704, a process similar to the process described with FIG. 4 above is performed. An example that adds additional details to this process is described below. For example, for each namespace in the compliant ADE, all of the roles can be scanned and grouped based on common elements, e.g., in the example discussed with FIG. 4 above, configuration files 490A-B were grouped based on roles having a common admin prefix. Other criteria that can be used for grouping include, but are not limited to, common suffixes of roles (e.g., the *operator pattern grouping sysoperator and DBoperator), and labels.

As described with FIG. 4 above, labels can be used to organize and to select subsets of objects, e.g., providing criteria for grouping for meta-policy generation. In an example that generates a meta-policy for a HIPAA compliant ADE, labels can be used to include or exclude different objects from analysis and inclusion in the meta-policy. For example, ADE 210 described in FIG. 2 above includes an engineering application 222C, an accounting application 222B, and a patient data application 222D. In this example, both the accounting application 222B and patient data application 222D can include HIPAA relevant data, while engineering application does not include this type of data.

As described with the description of FIG. 4 above, once grouped, configuration elements can be compared to determine commonalities. For example, in one or more embodiments, rules can be generated by analyzing selected groups of roles to determine what privileges all objects in the group must have, must not have, and must only have. In FIG. 4 above, example groups of roles included all roles in both configuration files 490A-B, and groups of privileges for specific resources (e.g., privileges granted to admin* roles for deployments). Analysis of these groups can facilitate the generation of rules similar to rules 401-404 discussed above.

At block 706, the rules generated by the analysis of block 704 can be aggregated into a meta-policy, e.g., by the processes described with FIG. 5 above. In the description depicted in FIG. 5, must have, must not have, and must only have rules can be listed in a meta-policy configuration file, for further use.

It should be noted that, in one or more embodiments, when a meta-policy is generated based, as described in blocks 702-704 above, on an ADE with a compliant combination of configuration options, this meta-policy can be applied to other ADEs to evaluate their compliance with the standard. It should also be noted that meta-policies can be modified to include additional or fewer configuration elements to, for example, alter the meta-policy to follow the standard with more precision.

In an example of this modification, in one or more embodiments, a domain expert can examine the policy to assess potential improvements to compliance. Based on this examination and assessment, the meta-policy can be modified to improve adherence to the standard, e.g., by ADEs to which the meta-policy is used for evaluation. It should be noted that this analysis and assessment can also be performed on the ADE that was used to generate the meta-policy, although, in some circumstances, direct evaluation of the ADE can be more time consuming. The use of domain expert analysis also discussed with the discussion below of compliance, using one or more embodiments, with the HIPAA standard.

At block 708 a new ADE is selected to be evaluated for compliance with the standard. In an alternate implementation, one or more embodiments can evaluate a previously configured ADE for continuing compliance with the standard. At block 710 a meta-policy of a compliant ADE (e.g., ADE 210) can be compared with new ADE 260A. By comparing the compliant meta-policy with ADE 260A and changing configuration elements in ADE 260A that deviate from the meta-policy, one or more embodiments can propagate compliant configuration elements to new ADEs. It is important to note that, when considering the operations performed by one or more embodiments to assess and change configuration elements in an ADE, one or more embodiments are not just copying or mirroring configuration elements from a compliant ADE to another ADE. In some circumstances, copied configuration elements are not adapted to handle the different characteristics of ADEs.

In an alternative approach described herein, by determining a common meta-policy in a compliant ADE and applying to another ADE, common principles can be enforced in the other ADE regardless of some differences. For example, ADEs can vary significantly in size, including the size of data handled, the number of authorized users, the number and variety of roles that the authorized users can have, and the number of resources that can be used to perform system activities. One or more embodiments can apply common policies to ADEs with size differences by using pattern matching to group large numbers of roles or users into groups that can be subject to the common meta-policies, e.g., admin* can group any number of roles that begin with admin, not just the two discussed with configuration files 490A-B above. One common policy that can be applied, for example, to administrator roles in certain types of ADEs is that these roles, notwithstanding their extensive access privileges, cannot, in accordance with some standards, have access to secret resources. As discussed below, in one or more embodiments that can propagate HIPAA compliance, this type of secret resource restriction can be mandatory.

Other differences in ADE implementations can include the global regions where the system operates. For example, different global regions can have different public and non-public data protection requirements. In some circumstances, ADEs can operate in multiple zones or regions. In one or more embodiments, labels address regional differences by enabling meta-policies to have portions labeled for different regions.

Other differences that can make copying configuration elements from a compliant ADE to another ADE, can include whether the other ADE is used for development, testing, or production. In one or more embodiments, labels can be used to differentiate the new ADE upon which the compliant meta policy is applied, e.g., elements in production systems can be labeled as such in the new ADE so that the meta-policy can be applied to these parts of the ADE.

At block 712, the results of the comparison of the meta-policy of the compliant ADE with the new ADE can be checked. If the new ADE is within the bounds of the meta-policy (e.g., as restrictive or more restrictive than the meta-policy), then block 730 can certify the new ADE as compliant with the standard. In an alternative embodiment, the standard may require certification by a third-party, and in this circumstance, a report of the comparison results can be provided by one or more embodiments as another source of compliance information.

In one or more embodiments, compliance analyzing component 156 can compare the meta-policy generated from a compliant ADE and the new ADE. If the new ADE is not within the bounds of the meta-policy (e.g., less restrictive than the meta-policy), then block 720 can cause the beginning of a remediation process to change configuration elements of the new ADE to be compliant with the standard. Details of an example remediation process used by one or more embodiments are included with the description of FIG. 8 below.

In one or more additional embodiments, compliance analyzing component 156 can analyze the meta-policy generated from compliant ADE to determine a minimum set of required configuration elements to be compliant with the standard. For example, based on factors that can include, but are not limited to, the specific elements of the standard, analysis of the compliant ADE, and analysis of other compliant ADEs, compliance analyzing component 156 can determine that, for example, a base level of security is the minimum required for an ADE to be compliant with the standard. This minimum set of required configuration elements can be used with the meta-policy to evaluate the compliance of the new ADE with the standard.

Figure 8:
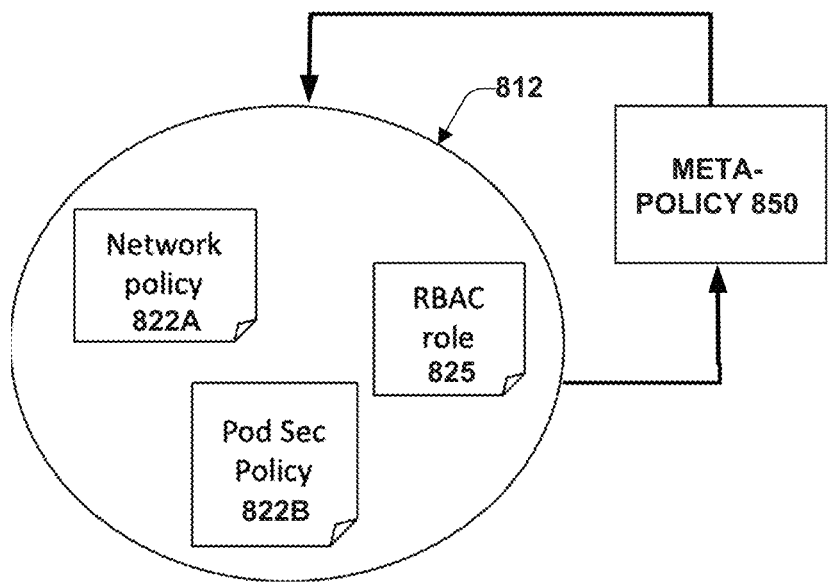
FIG. 8 illustrates a system that can facilitate the monitoring of configuration settings in an ADE, and the remediation of ADE configuration settings to correct errors, in accordance with one or more embodiments.

FIG. 8 illustrates a system 800 that can facilitate the monitoring of configuration settings in an ADE, and the remediation of ADE configuration settings to correct errors, in accordance with one or more embodiments. Repetitive description of like elements and/or processes employed in respective embodiments is omitted for sake of brevity.

As depicted, ADE 812 can include configuration elements, e.g., network policy 822A-B, and RBAC roles 825. In this example, the configuration elements of ADE 812 were configured based on an application of a meta-policy, e.g., as described with blocks 708, 710, 712, and 730 above. The meta-policy 850 applied to ADE 812 in this example was generated based on HIPAA compliant ADE 210.

As noted above, many standards, including HIPAA, can include provisions that mandate review of compliant configurations in certain circumstances, e.g., periodic compliance assessments to reassess compliance, such assessments triggered, for example, due to changes within the ADE environment described below. Other standards can have similar reassessment requirements, e.g., corporate financial reporting standards.

As depicted in FIG. 8, one or more embodiments can be used to reevaluate configuration elements using a meta-policy 850. Configuration elements can deviate from standard guidelines for a variety of reasons, including, but not limited to, hardware configuration changes, application installation, errors made in adding or removing users, errors made in configuring roles and RBAC, and errors made in configuration of new applications or groups of applications (e.g., pods).

As described above, configuration comparison component 157 can be used (e.g., in block 710 above) to compare meta-policies to ADE configuration elements. In this example, configuration comparison component 157 can be used to evaluate ADE configuration elements as compared to the meta-policy based on a standard compliant ADE. Continuing the example of FIG. 8 described above, the underlying computer hardware of ADE 812 (e.g., as described in FIG. 11 below) can be subject to changes that require updating of configuration elements, e.g., new storage resources (e.g., increasing storage 170) can be brought online, and to remain compliant configuration elements may need to be changed.

In one or more embodiments, changes to network policy 822A can be required to provide network access to the new storage resources. Changes to configuration elements can be made automatically, by application or operating system processes, and also manually by system administrators. In an example not intended to be representative of actual actions, network during the installation of the new storage resources, network policy 822A, managing privileges for a network connection resource, was not updated in compliance with HIPAA standards, e.g., an update privilege for the network connection resource was inadvertently granted to an operator role, in order to facilitate the installation of the new storage resources.

Used for evaluation, in this example, configuration comparison component 157 compares meta-policy 850 to the current configuration of ADE 812, including network policy 822A. Having aggregated rules for access to network connection resources, meta-policy 850 can specify that network connection resource must only have update privileges granted to administrators, e.g., roles matching admin*. Based on the example erroneous grant of update privileges to operators, configuration comparison component 157 detects the deviation from meta-policy 850 and reports this deviation as a potential compliance issue to be addressed.

In an alternative embodiment, when a deviation from meta-policy 850 is detected (e.g., by configuration comparison component 157) one or more embodiments can provide remediation guidance for correcting deviating configuration elements. For example, not only can deviating configuration element be detected and reported, one or more embodiments, can provide meta-policy examples that can potentially be used to remediate compliance errors. It should be noted that, as discussed above (e.g., block 720), remediation processes similar to those discussed above can also be used at the time of initial evaluation of an ADE, e.g., in blocks 710, 712, and 720 described in FIG. 7 above.

In another alternative example, since meta-policy 850 was used to initially certify compliance of ADE 812, meta-policy has also been changed, e.g., to match changed in the standard the meta-policy represents. In one or more embodiments, the original compliant ADE used to generate meta-policy 850 can be changed (e.g., by a domain expert as a part of normal production updates), and these changes can be detected (e.g., by state analyzer 152) and the changes can be used to update meta-policy 850 (e.g., by policy generator 154) before it is used in the example discussed above. In a variation to the example above, when the domain expert modifies the configuration of the original ADE (e.g., to permit the granting of update privilege for network connection resources to operators), this change is integrated into meta-policy 850 by one or more embodiments. Subsequently, the example changes made to network policy 822A in ADE 812 are not detected as deviating from meta-policy 850 and ADE 812 continues to be HIPAA compliant.

Figure 9:
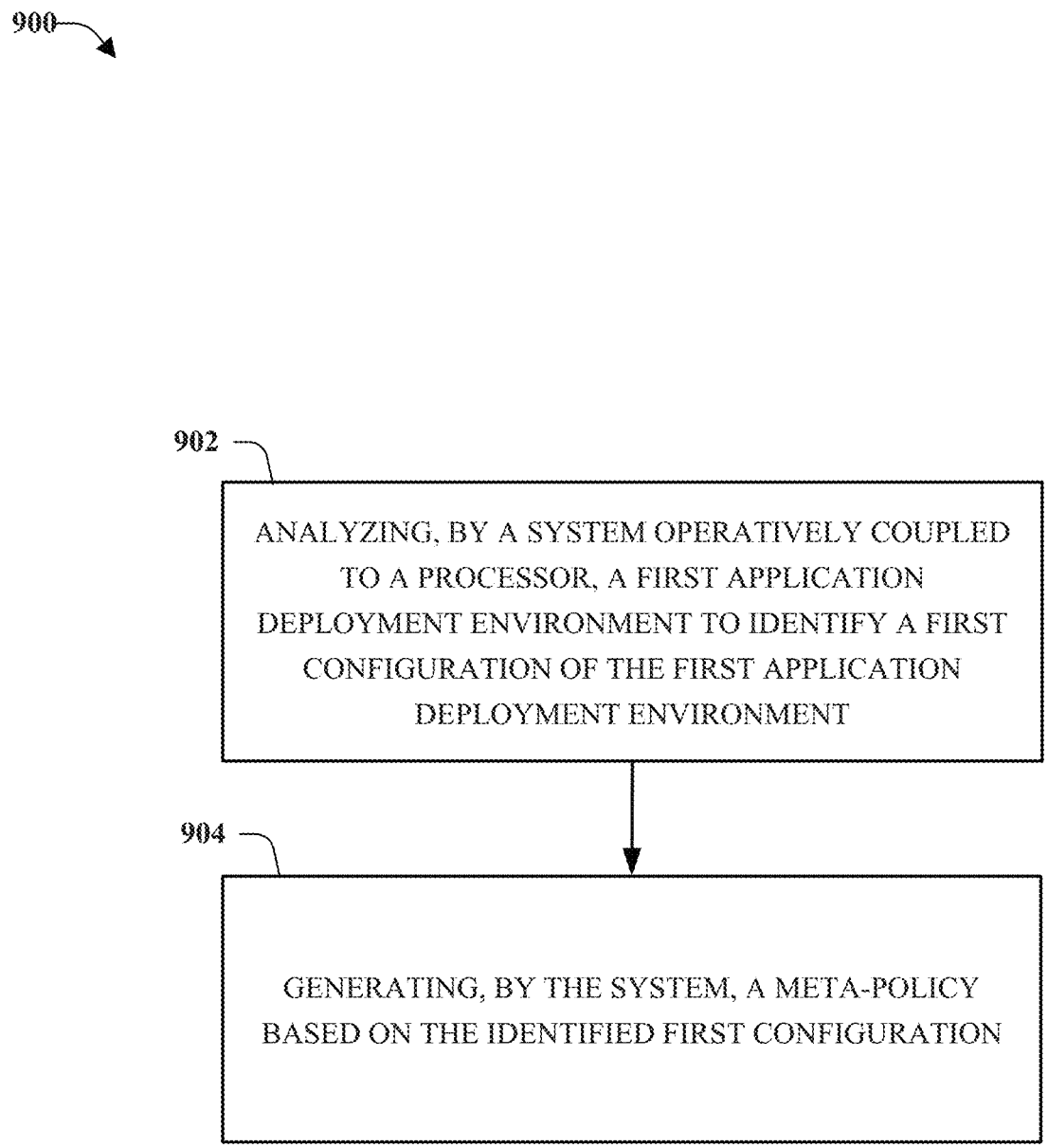
FIG. 9 illustrates a flow diagram of an example, non-limiting computer-implemented method that can facilitate generating and applying meta-policies an ADE in accordance with one or more embodiments described herein.

FIG. 9 illustrates a flow diagram of an example, non-limiting computer-implemented method 900 that can facilitate generating a meta-policy for an ADE in accordance with one or more embodiments described herein. Repetitive description of like elements and/or processes employed in respective embodiments is omitted for sake of brevity.

At 902, method 900 includes analyzing, by state analyzer 152 in system 150 operatively coupled to a processor 160, a first application deployment environment 210 to identify a first configuration (e.g., environment configuration 215) of the first application deployment environment 210. At 904, method 900 includes generating, by policy generator 154 in system 150, a meta-policy configuration file 500 based on the identified first configuration (e.g., environment configuration 215).

Figure 10:
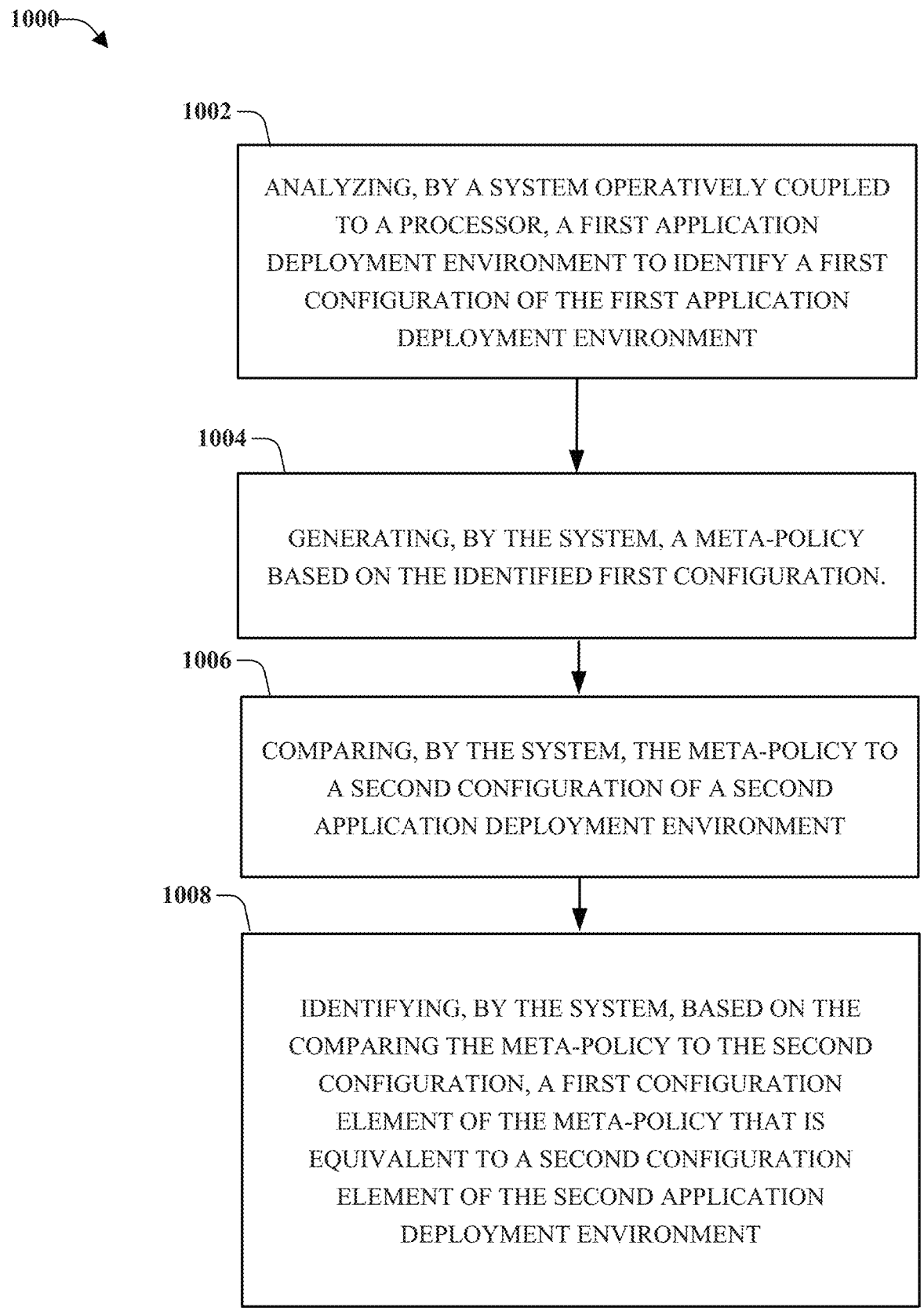
FIG. 10 illustrates a flow diagram of an example, non-limiting computer-implemented method that can facilitate generating and applying a meta-policy for an ADE in accordance with one or more embodiments described herein.

FIG. 10 illustrates a flow diagram of an example, non-limiting computer-implemented method 1000 that can facilitate generating and applying a meta-policy for an ADE in accordance with one or more embodiments described herein. Repetitive description of like elements and/or processes employed in respective embodiments is omitted for sake of brevity.

At 1002, method 1000 includes analyzing, by state analyzer 152 in system 150 operatively coupled to a processor 160, a first application deployment environment 210 to identify a first configuration (e.g., environment configuration 215) of the first application deployment environment 210. At 1004, method 1000 includes generating, by policy generator 154 in system 150, a meta-policy configuration file 500 based on the identified first configuration (e.g., environment configuration 215). At 1006, method 1000 includes comparing, by configuration comparison component 157 in system 150, the meta-policy configuration file 500 to a second configuration (e.g., environment configuration 265A) of a second application deployment environment 260A. At 1008, method 1000 includes identifying, by the system, based on the comparing by configuration comparison component 157, the meta-policy configuration file 500 to the second configuration (e.g., environment configuration 265A), a first configuration element (e.g., network policy 214) of the meta-policy configuration file 500 that is equivalent to a second configuration element of the second application deployment environment 260A.

Figure 11:
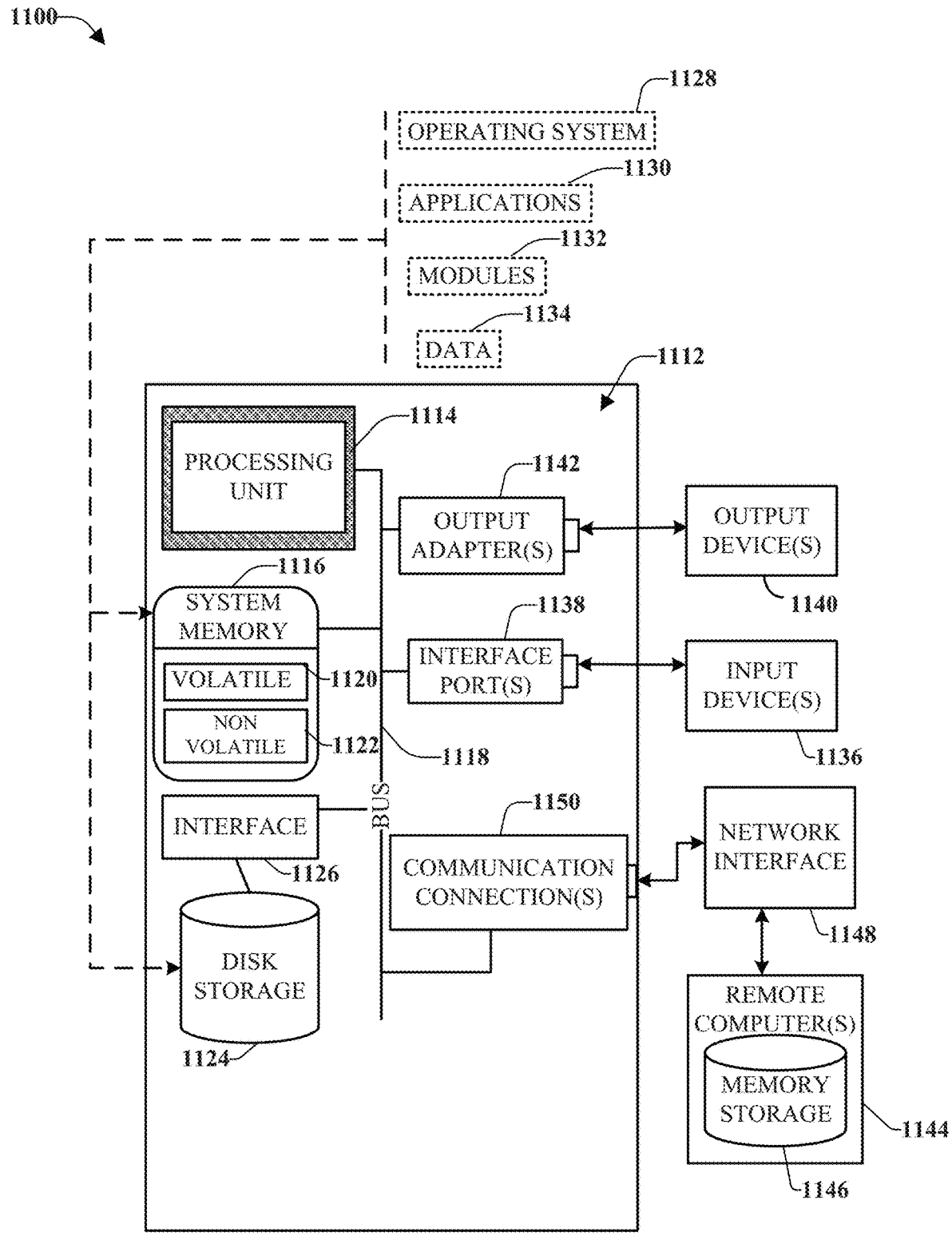
FIG. 11 illustrates a block diagram of an example, non-limiting operating environment in which one or more embodiments described herein can be facilitated.

FIG. 11 illustrates a suitable operating environment 1100 for implementing various aspects of this disclosure can also include a computer 1112. In order to provide a context for the various aspects of the disclosed subject matter, FIG. 11 as well as the following discussion are intended to provide a general description of a suitable environment in which the various aspects of the disclosed subject matter can be implemented. FIG. 11 illustrates a block diagram of an example, non-limiting operating environment in which one or more embodiments described herein can be facilitated. For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

The computer 1112 can include a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multiprocessor architectures also can be employed as the processing unit 1114. The system bus 1118 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 1116 can also include volatile memory 1120 and nonvolatile memory 1122. The basic input/output system (BIOS), containing the basic routines to transfer information between elements within the computer 1112, such as during start-up, is stored in nonvolatile memory 1122. Computer 1112 can also include removable/non-removable, volatile/non-volatile computer storage media. FIG. 11 illustrates, for example, a disk storage 1124. Disk storage 1124 can also include, but is not limited to, devices like a magnetic disk drive, floppy disk drive, tape drive, Jaz drive, Zip drive, LS-100 drive, flash memory card, or memory stick. The disk storage 1124 also can include storage media separately or in combination with other storage media. To facilitate connection of the disk storage 1124 to the system bus 1118, a removable or non-removable interface is typically used, such as interface 1126. FIG. 11 also depicts software that acts as an intermediary between users and the basic computer resources described in the suitable operating environment 1100. Such software can also include, for example, an operating system 1128. Operating system 1128, which can be stored on disk storage 1124, acts to control and allocate resources of the computer 1112.

System applications 1130 take advantage of the management of resources by operating system 1128 through program modules 1132 and program data 1134, e.g., stored either in system memory 1116 or on disk storage 1124. It is to be appreciated that this disclosure can be implemented with various operating systems or combinations of operating systems. A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port can be used to provide input to computer 1112, and to output information from computer 1112 to an output device 1140. Output adapter 1142 is provided to illustrate that there are some output devices 1140 like monitors, speakers, and printers, among other output devices 1140, which require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a computer, a server, a router, a network PC, a workstation, a microprocessor based appliance, a peer device or other common network node and the like, and typically can also include many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1150 refers to the hardware/software employed to connect the network interface 1148 to the system bus 1118. While communication connection 1150 is shown for illustrative clarity inside computer 1112, it can also be external to computer 1112. The hardware/software for connection to the network interface 1148 can also include, for exemplary purposes only, internal and external technologies such as, modems including regular telephone grade modems, cable modems and DSL modems, ISDN adapters, and Ethernet cards.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions that implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer-implemented process, such that the instructions, which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
 analyzing, by a system operatively coupled to a processor, a first application deployment environment to identify a first configuration of the first application deployment environment; and
 generating, by the system, a meta-policy based on the identified first configuration,
  wherein the generating the meta-policy comprises:
   identifying, by the system, common elements in the first configuration of the first application deployment environment, wherein the common elements are identified based on a determination that there is a common suffix for two or more roles.

2. The computer-implemented method of claim 1, further comprising:
 comparing, by the system, the meta-policy to a second configuration of a second application deployment environment; and
 identifying, by the system, based on the comparing the meta-policy to the second configuration, a first configuration element of the meta-policy that is equivalent to a second configuration element of the second application deployment environment.

3. The computer-implemented method of claim 2, wherein the identifying the first configuration element that is equivalent to a second configuration element comprises determining a semantic equivalence between the first configuration element and the second configuration element.

4. The computer-implemented method of claim 2, wherein the identifying the first configuration element that is equivalent to a second configuration element comprises applying a rule of the meta-policy to the second configuration element.

5. The computer-implemented method of claim 1, wherein the identifying the first configuration of the first application deployment environment comprises identifying patterns of settings in the first configuration.

6. The computer-implemented method of claim 1, wherein the generating the meta-policy further comprises:
 generating, by the system, an aggregated element based on the identified common elements, wherein the meta-policy comprises the aggregated element.

7. The computer-implemented method of claim 1, wherein the first application deployment environment comprises a cluster of one or more applications.

8. The computer-implemented method of claim 1, wherein the first application deployment environment comprises an application deployment environment that is approved based on a data protection standard.

9. The computer-implemented method of claim 8, further comprising, determining a minimum set of configuration elements required to be compliant with the data protection standard.

10. A computer program product facilitating generating a meta-policy based on a first application deployment environment, the computer program product comprising a computer readable storage medium having program instructions embodied therewith, the program instructions executable by a processor to cause the processor to:
 analyze the first application deployment environment to identify a first configuration of the approved first application deployment environment;
 generate the meta-policy based on the identified configuration;
 compare a first configuration element of the meta-policy with a second configuration of the second application deployment environment; and
 determine, by the processor, a semantic equivalence between the first configuration and the second configuration, wherein the semantic equivalence is determined based on a determination of commonality between privileges for roles.

* * * * *